United States Patent [19]

Wang

[11] Patent Number: 5,001,742

[45] Date of Patent: Mar. 19, 1991

[54] BASEBAND SIGNAL PROCESSING UNIT AND METHOD OF OPERATING THE SAME

[75] Inventor: Robert C. Wang, Mendham, N.J.

[73] Assignee: AT&T Bell Laboratories, Murray Hill, N.J.

[21] Appl. No.: 471,460

[22] Filed: Jan. 29, 1990

[51] Int. Cl.⁵ .................... H04M 11/00; H04B 1/56; H04J 4/00

[52] U.S. Cl. ........................................ 379/60; 370/29; 370/50

[58] Field of Search .................. 370/28, 29, 32, 110.1; 375/53; 379/59, 60, 63; 453/33, 34, 72

[56] References Cited

U.S. PATENT DOCUMENTS

| | | | |
|---|---|---|---|
| 4,513,412 | 4/1985 | Cox | 370/29 |
| 4,670,899 | 6/1987 | Brody et al. | 379/60 |
| 4,675,863 | 6/1987 | Paneth et al. | 370/50 |

OTHER PUBLICATIONS

IEEE Standard Dictionary of Electrical and Electronics Terms, 1984, p. 82.
Introduction to Digital Signal Processing by Proakis and Manolakis pp. 395-400 and 795-848.
IEEE Transactions on Acoustics, Speech and Signal Processing, 12/89 "Interprocessor Communications in Synchronous Multiprocessor Digital Signal Processing Chips" by Decaluwe et al.
G. A. Arredondo, J. C. Feggeler, and J. I. Smith, *The Bell System Technical Journal*, vol. 58, pp. 97-143 (1979).
N. Ehrlich, R. E. Fisher, and T. K. Wingard, *The Bell System Technical Journal*, vol. 58, pp. 153-199 (1979).

*Primary Examiner*—Jin F. Ng
*Assistant Examiner*—William D. Cumming
*Attorney, Agent, or Firm*—R. B. Levy

[57] ABSTRACT

A baseband processing unit (10) for use in a cellular telephone cell site includes a digital signal processor (20) which serves to process forward voice signals intended for transmission to a mobile unit (12) as well as process the reverse voice signals received from the mobile unit. The digital signal processor further serves to produce a first supervisory audio tone (SAT) for transmission to the mobile unit by generating successive digital SAT samples which are decoded into a continuous tone. In addition, the digital signal processor serves to detect the presence of a second SAT generated by the mobile unit by sampling and processing successive samples of the second SAT and measuring the power thereof.

13 Claims, 5 Drawing Sheets

SAT GENERATION

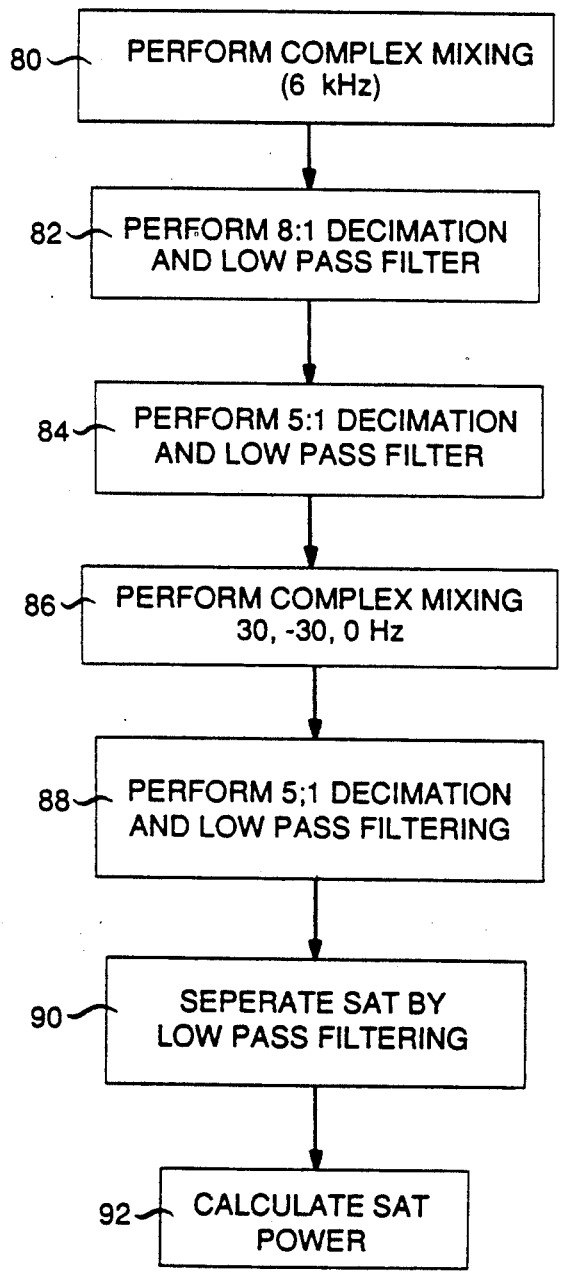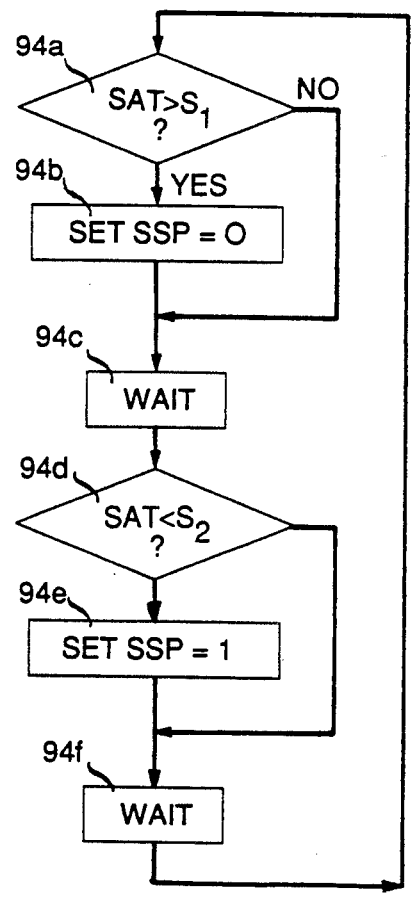

BASEBAND SIGNAL PROCESSING UNIT AND METHOD OF OPERATING THE SAME

TECHNICAL FIELD

This invention relates generally to a baseband signal-processing unit for processing voice and audio tone signals.

BACKGROUND OF THE INVENTION

Within present day cellular telephone systems, there exist audio processing circuits for processing both forward and reverse voice signals. Forward voice signals are voice signals which are carried to a land-based cell site via a telephone trunk line for transmission by a transmitter to a mobile telephone unit. Forward voice signals also include the voice signals previously received at the land-based cell site from a mobile unit for re-transmission to another mobile unit. Reverse voice signals are voice signals which are transmitted from the mobile unit to a receiver at the cell site.

Presently, forward voice signals are processed by a transmit audio processor which operates to syllabically compress and pre-emphasize the forward voice signal in order to control the level of noise in the FM environment. The transmit audio processor also serves to superimpose a supervisory audio tone (SAT), supplied from a separate signal generator, onto the forward voice signal. It is the combination of the forward voice signal and the SAT which is transmitted from the cell site to the mobile unit.

The mobile unit will transpond (send back) the received SAT signal. As long as a SAT is received at the land-based cell site from the mobile unit, the mobile unit is deemed to be in communication with the cell site for purposes of placing the telephone trunk line in an off-hook state. For this reason, a SAT detector is coupled to the receive audio processor for detecting the presence of the SAT signal transponded from a mobile unit. In addition to receiving the SAT from the mobile unit, the receiver also receives reverse voice signals which are processed by a receive audio processor which expands and de-emphasizes the received signal. For a more complete description of cellular telephone systems, and the transmit and receive voice processors contained therein, reference should be had to the *Bell System Technical Journal*, Jan. 1979, Vol. 58, No. 1, at pages 97-122 and 153-200, herein incorporated by reference.

At the present time, the transmit and receive audio processors are each comprised of separate analog circuits. The SAT generator and SAT detector are also comprised of separate analog circuits. A land-based cell site typically has several transmitter and receiver channels, each requiring a separate transmit audio processor and receive audio processor, respectively. Further, three separate SAT generators and detectors are required for each of the three SAT frequencies (5970, 6000 and 6030 Hz) presently used in cellular telephone systems. Depending on the number of receiver and transmitter channels, the physical space consumed by the transmit and receive voice processor and the SAT detectors can be large, thus increasing the overall space required for each land-based cell site.

Thus, there is a need for a more compact apparatus for processing the forward and reverse voice signals, as well as for generating and detecting SAT signals.

SUMMARY OF THE INVENTION

In accordance with the invention, an apparatus is provided for processing forward and reverse voice signals and for generating and detecting first and a second control signals (SAT's), respectively. The apparatus comprises a processor (e.g., a digital signal processor) which periodically acquires forward voice signals, each of which is then processed by the processor before the signal is transmitted to the mobile unit. Reverse voice signals are also periodically acquired from the mobile unit by the processor and each is processed prior to being output (either to a telephone trunk, or to a different mobile unit). Within the interval between successive acquisitions of a forward voice signal, the processor also periodically generates a first SAT for transmission to the mobile unit by producing at least two successive digitized SAT samples during this interval. Also within the interval between successive acquisitions of the forward voice signal, the processor detects if a SAT of a particular frequency is received from the mobile unit in response to the SAT transmitted to it. The processor typically accomplishes SAT detection by obtaining and thereafter analyzing successive samples of the incoming SAT. The processor is coupled to a communications mechanism, which typically comprises at least one, and preferably two CODECS, which serve to code and decode digital voice and SAT data communicated between the processor and a receiver and transmitter at the land-based cell site.

BRIEF DESCRIPTION OF THE DRAWINGS

FIG. 6 is a flowchart diagram depicting the steps executed by the baseband unit of FIG. 1 to detect a second SAT;

FIG. 8 is a flowchart diagram depicting the steps executed by the baseband unit of FIG. 1 to determine the level of SAT power.

DETAILED DESCRIPTION

Figure 1:
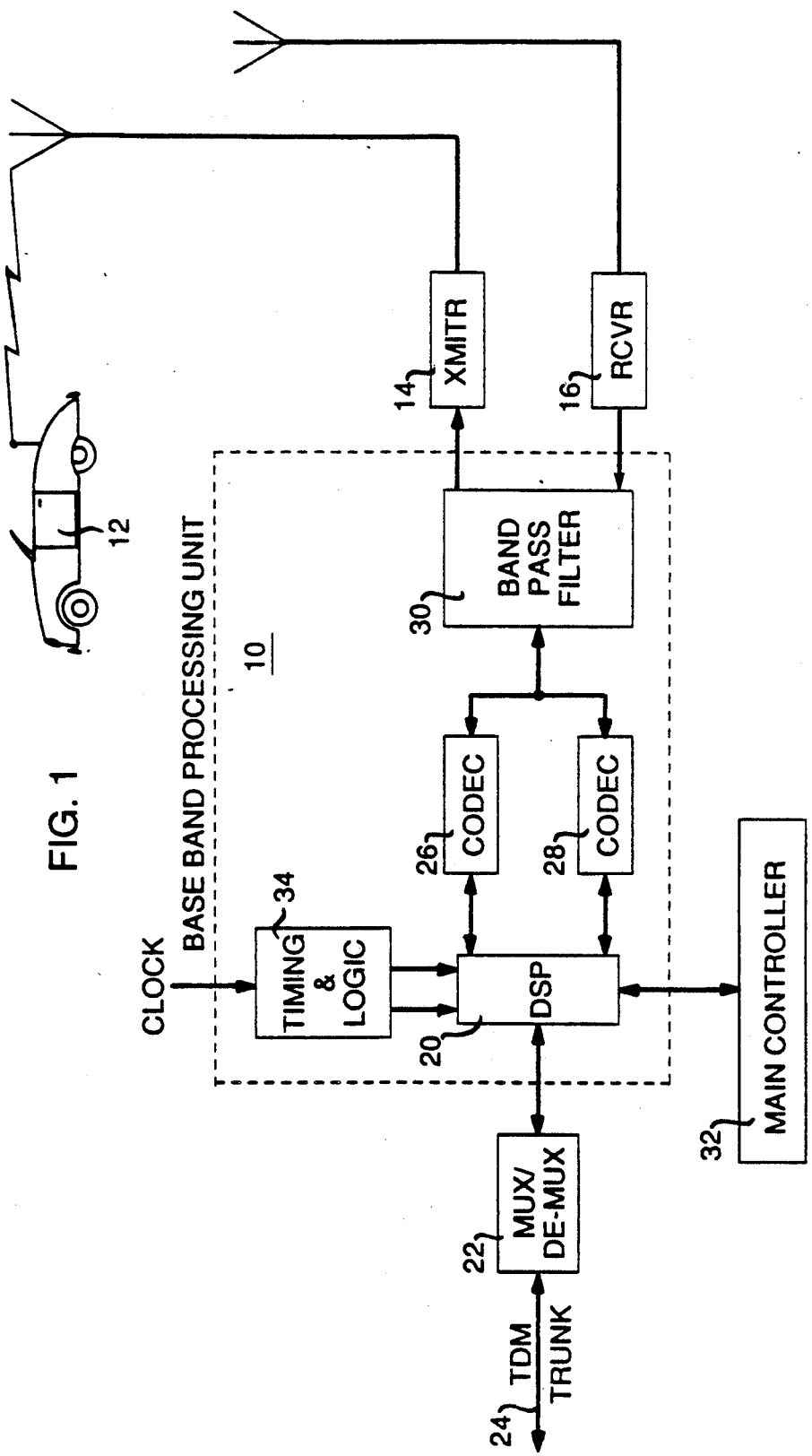
FIG. 1 is a block schematic diagram of a baseband signal-processing unit in accordance with a preferred embodiment of the invention.

FIG. 1 illustrates a baseband signal-processing unit 10, in accordance with the invention, for processing forward and reverse voice signals transmitted to, and received from, respectively, a mobile unit 12 via a transmitter 14 and receiver 16, respectively. The baseband unit 10 further serves to generate a first supervisory audio tone (SAT) for transmission to the mobile unit 12 by the transmitter 14. Additionally, the baseband unit 10 also serves to detect the presence of a second SAT generated by the mobile unit 12 in response to the first SAT.

The baseband unit 10 is comprised of a processor 20, preferably, a digital signal processor (DSP), such as the WE ® DSP '16 manufactured by AT&T, Allentown, Penn. For a further description of the WE ® DSP 16 digital signal processor, reference should be had to the text: The WE ® DSP 16 and 16A *Digital Signal Processor Information Manual*, published by AT&T, 1989. The digital signal processor (DSP) 20 is connected via its internal serial port (not shown) to a multiplexer-de-multiplexer 22 which serves to interface the DSP to a time-domain multiplexed (TDM) line 24. Typically, the line 24 is a T1 telephone trunk which carries time-domain multiplexed voice signals between the baseband unit 10 and a telephone central office (not shown). The voice data on the line 24 is sampled at 8 KHz and the serial bit clock is typically 512 KHz.

The DSP 20 is also coupled via its internal serial port to a pair of coder-decoders (CODEC's) 26 and 28 which serve to code and decode voice signal data and supervisory audio tone (SAT) data, respectively, communicated between the DSP 20 and a bandpass filter 30, which coupled to the transmitter 14 and receiver 16. The CODEC's 26 and 28 typically take the form of an AT&T model T7522 CODEC and a Motorola model 144402 CODEC, respectively. While in the illustrated embodiment of FIG. 1, two separate CODEC's 26 and 28 are employed to code and decode voice signal and SAT data, respectively, to the filter 30, a single CODEC could be employed. Moreover, while present day cellular telephones operate to transmit and receive analog signals, necessitating their decoding and encoding in order to process them in a digital manner, future systems may directly transmit digital voice and SAT data. Thus, each of the CODEC's 26 and 28 would be replaced with another type of signal communication device as appropriate.

The DSP 20 has an internal parallel port which is coupled to a main controller (computer) 32 located at the cell site for controlling the baseband unit 10 in a manner described hereinafter. Typically the DSP 20 receives commands from the main controller 32 which specify the manner in which the DSP is to process forward and reverse speech signals, as well as the frequency color for SAT generation and detection. The DSP 20 supplies the main controller 34 with status information indicative of the power level of the SAT received from the mobile unit 12.

Associated with the DSP 20 is a conventional timing and logic circuit 34 which derives a 2.048 MHz, a 512 KHz and an 8 KHz signal from the line 24. From the signals derived from the line 24, the timing and logic circuit 34 generates at least two sync signals, one at 32 KHz and one at 8 KHz, which are supplied to the DSP 20. The combination of the DSP 20, the CODEC's 26 and 28, the bandpass filter 30 and the timing and logic circuit 34 comprises the baseband unit 10.

Figure 2:
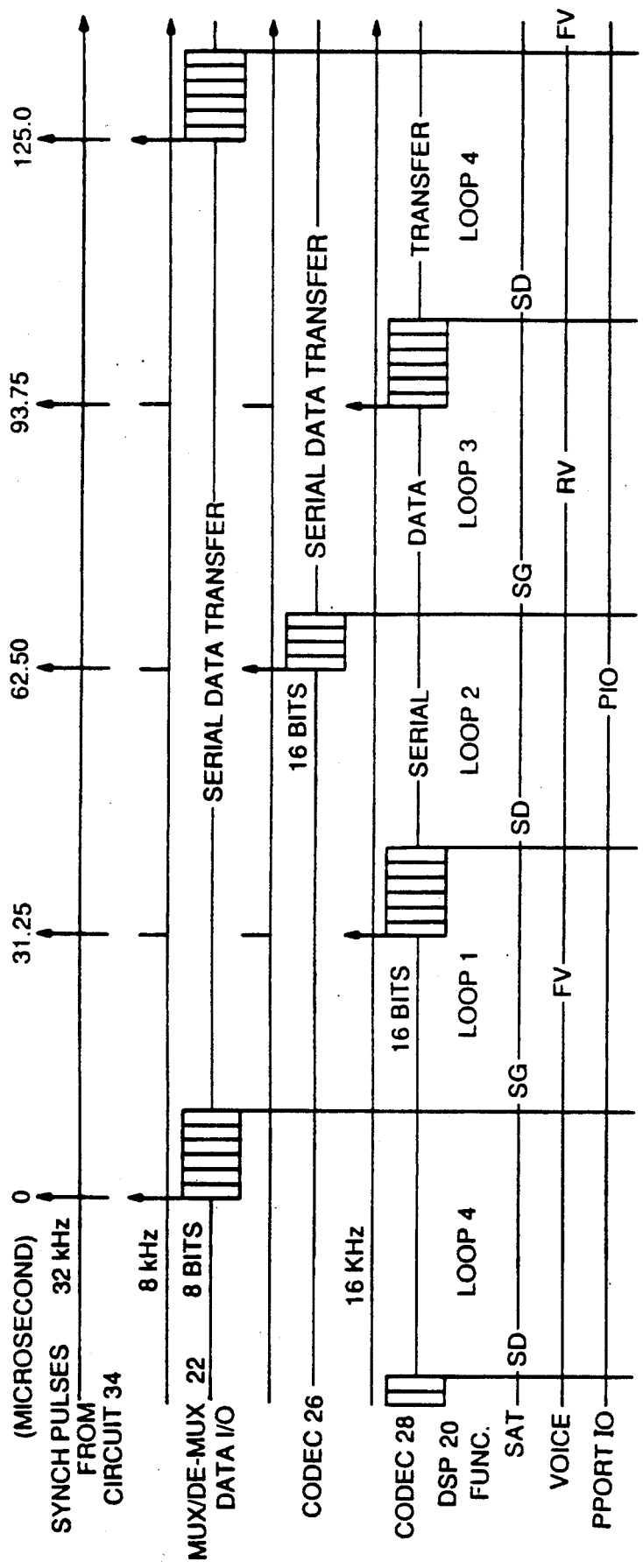
FIG. 2 is a timing diagram illustrating the sequence of activities occurring within the baseband signal-processing unit of FIG. 1.

Referring now to FIG. 2, there is shown a timing diagram which illustrates the overall sequence of events occurring during the operation of the baseband unit 10 of FIG. 1. As shown in the upper portion of FIG. 2, the 32 KHz sync pulses have a period 31.25 microseconds whereas the 8 KHz sync pulses have a period of 125 microseconds. The 125 microsecond period of the 8 KHz sync pulses constitutes the operating cycle of the DSP 20. At the beginning of each cycle, the multiplexer-de-multiplexer (mux/de-mux) 22 of FIG. 1 is strobed by the timing and logic 34 and, in response, the mux/de-mux 22 supplies an eight-bit forward voice signal which it has obtained from the line 24 of FIG. 1, the forward voice signal being intended for transmission to the mobile unit 12 of FIG. 1. At the same time, an eight-bit reverse voice signal, which had been processed by the DSP 20 during its previous cycle, is placed on the line 24 by the mux/de-mux 22.

Referring to the bottom portion of FIG. 2, during each 125 microsecond interval, the DSP 20 does both forward voice signal processing (FV) and reverse voice signal processing (RV). To this end, the CODEC 26, which carries both forward and reverse voice signals, is strobed once during each operating signal of the DSP 20 to decode the digital forward voice signal prior to its transmission. The reverse voice is encoded by the CODEC 26 prior to processing by the DSP 20. Also, during each 125 microsecond cycle, the DSP 20 generates a SAT signal, (SG) by producing for output each of two successive digital SAT samples in a manner described hereinafter. The period of the SAT samples (62.5 microseconds) is such that when the samples are decoded by the CODEC 28, a continuous wave SAT will result. In addition to producing each of a successive pair of digital SAT samples, the DSP 20 also detects the presence of a SAT (SD) received from the mobile unit 12 by taking two successive samples of the incoming SAT from the mobile unit 12 of FIG. 1, as digitized (coded) by the CODEC 28 of FIG. 1. Lastly, during its 125 microsecond cycle, the DSP 20 communicates with the main controller 32 of FIG. 1 (PIO) to obtain commands and provide status information.

Each of the activities of SAT generation, SAT detection, forward and reverse voice signal processing and communication with the main controller 32 of FIG. 1, occurs within a 31.25 microsecond interval or loop. There are four such loops (1, 2, 3 and 4) within each 125 microsecond DSP 20 operating cycle. As discussed earlier, SAT generation is undertaken by producing successive digital samples of a SAT during each operating cycle of the DSP 20. Each successive SAT sample is output to the CODEC 28 for decoding during a separate one of loops 1 and 3. Detection of the SAT produced by the mobile unit 12 is accomplished by successively sampling the incoming SAT signal (as decoded by the CODEC 28) during both loops 2 and 4. Forward and reverse voice signal processing (FV,RV) occurs during a separate one of loops 1 and 3, respectively, while communication with the main processor 34 of FIG. 1 (PIO) occurs during loop 2.

Each successive one of the loops 1, 2, 3 and 4 does not start or end upon the generation of a successive one of the 32 KHz sync pulses. Rather, each of the 32 KHz sync pulses occurs after expiration of ½ the loop duration. The reason is that the 32 KHz sync pulses are employed to strobe the CODEC's 26 and 28 at a point in time after voice signal processing and SAT generation, respectively, has occurred so that these activities must occur first. Thus, for ease of discussion, each loop is shown as starting before, and ending after, each 32 KHz pulse.

Figure 3:
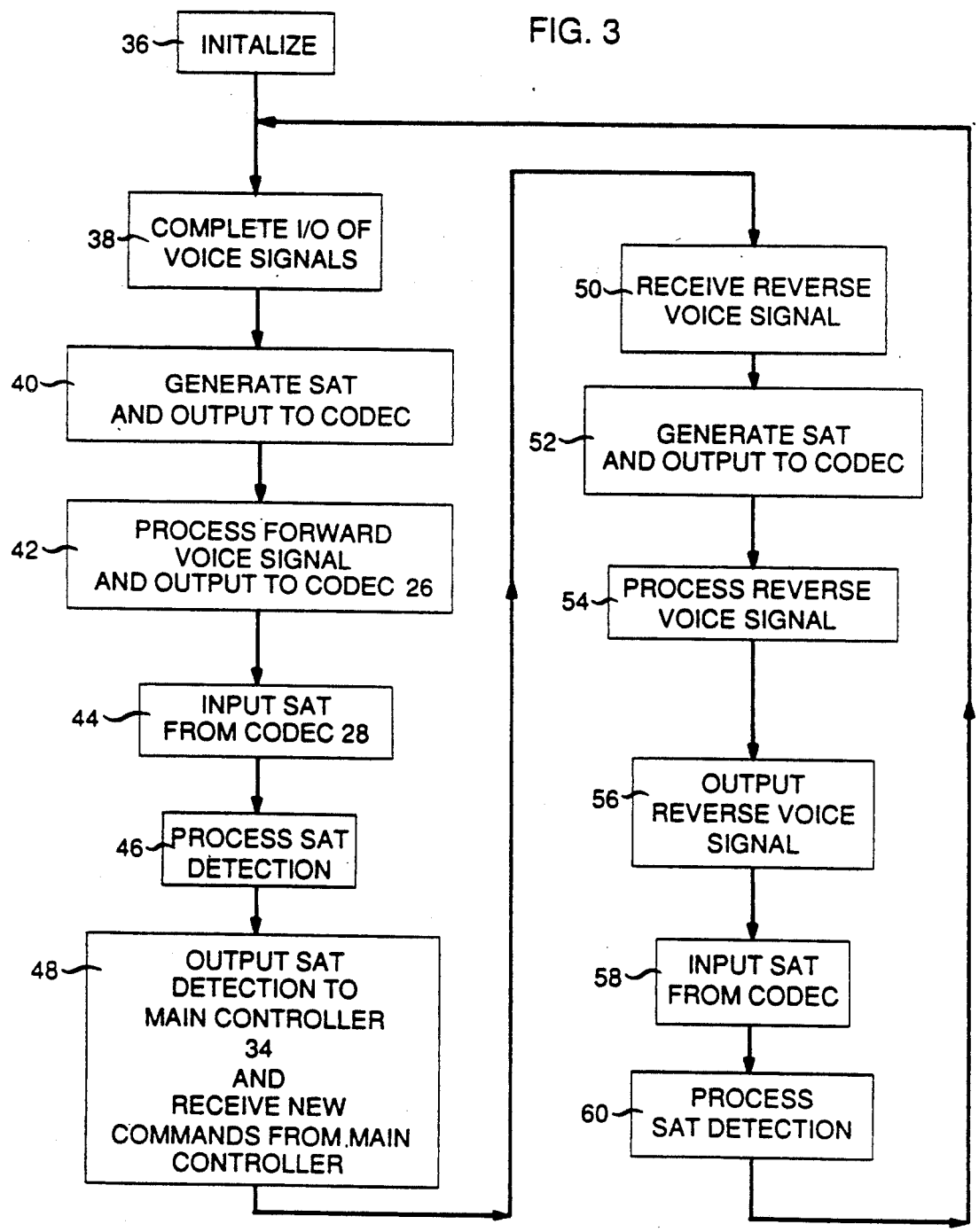
FIG. 3 is a flowchart diagram of the operations performed by the baseband processing unit of FIG. 1.

FIG. 3 illustrates a flowchart diagram depicting the specific steps executed by the DSP 20 in greater detail. At the outset of operation, the DSP 20 is initialized during step 36. During this step, forty separate values of $\sin(2\pi n/40)$ and $\cos(2\pi n/40)$ (where $n = 1, 2, 3 \ldots 40$) are established within the DSP 20. Since the functions of $\sin(2\pi n/40)$ and $\cos(2\pi n/40)$ are periodic, only a single table of fifty values is necessary to obtain the forty separate sin and cos values. As will be described, these stored values are employed in the process of SAT generation and SAT detection.

Following step 36, step 38 is executed and the DSP 20 completes the input of a fresh forward voice signal and the output of a previously processed reverse voice signal. For purposes of discussion, input and output (I/O) of voice signals is assumed to occur between the DSP 20 and the line 24, via the mux/de-mux 22 of FIG. 1. This is the case while a telephone call takes place between a land-based subscriber (not shown) and the mobile unit 12. It should be understood that the process illustrated in FIG. 3 will also occur during a telephone call between the mobile unit 12 and another mobile unit (not shown). Assuming a call between a land-based subscriber and the mobile unit 12, the timing and logic 34 will strobe the mux/de-mux 22 during step 38 to obtain the eight-bit (forward) voice signal on the line 24.

Figure 4:
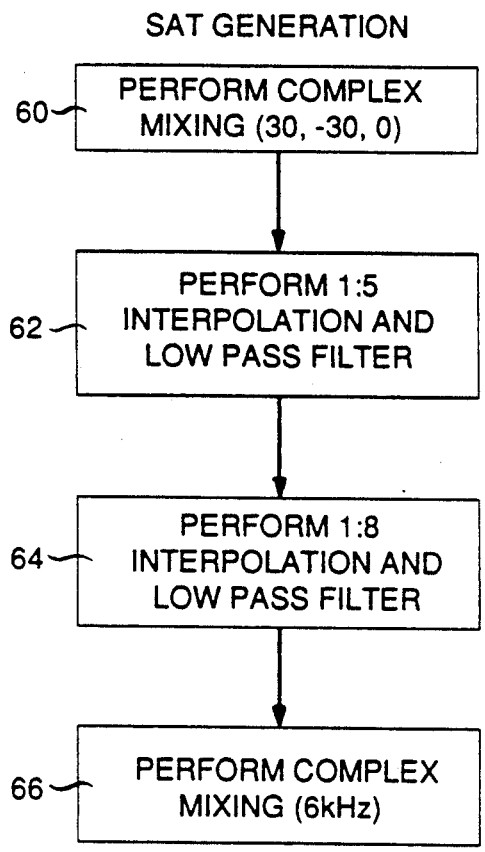
FIG. 4 is a flowchart diagram depicting the steps executed by the baseband unit of FIG. 1 to generate a first supervisory audio tone (SAT)

Next, the DSP 20 undertakes generation of a first SAT (step 40) in a manner described in greater detail with respect to FIG. 4. As will be described, the DSP 20 generates the first SAT by producing for output successive digitized sinusoidal samples once every 62.5 microseconds. Thus, 16,000 digitized SAT samples are output every second. After each such sample is generated, the sample is output by the DSP 20 to the CODEC 28 of FIG. 1 for decoding prior to receipt by the transmitter 14 of FIG. 1, which superimposes the first SAT on each forward voice signal transmitted to the mobile unit 12 of FIG. 1. When the SAT samples are output to the CODEC 28 at this rate, the CODEC will generate a continuous SAT.

Figure 5:
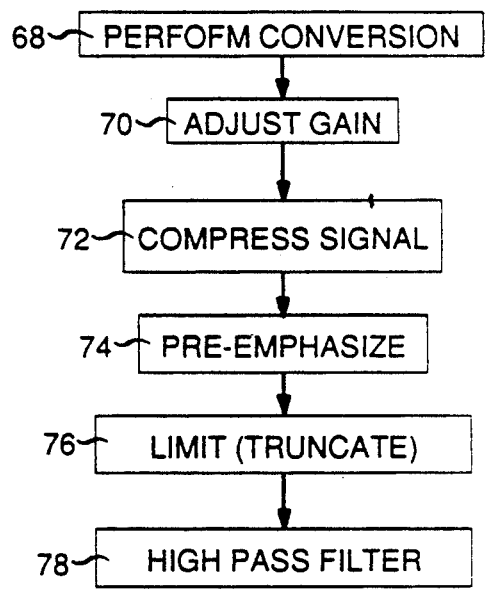
FIG. 5 is a flowchart diagram depicting the steps executed by the baseband unit of FIG. 1 to process a forward voice signal.

Referring to FIG. 3, following step 40, step 42 is executed and the DSP 20 of FIG. 1 processes the forward voice signal (step 42) in a manner described in greater detail in FIG. 5. The forward voice signal processed by the DSP 20 is then supplied to the CODEC 26 for decoding prior to transmission by the transmitter 14 of FIG. 1. Next, step 44 is executed, and a digitized sample of the second SAT received from the mobile unit 12 of FIG. 1 is input from the CODEC 28 to the DSP 20 during step 44. During the interval that the mobile unit 12 of FIG. 1 is in receipt of the first SAT from the transmitter 14 of FIG. 1, the mobile unit responds with its own SAT which is being referred to as the second SAT to avoid confusion with the one generated by the baseband unit 10 of FIG. 1.

Following step 46, then, step 48 is executed and the DSP 20 of FIG. 1 detects whether indeed the second SAT has been faithfully received (i.e., its power level is above a threshold value). The particular method by which the DSP 20 detects the presence of the second SAT is described in greater detail in flowchart form in FIG. 6.

After SAT detection, the DSP 20 communicates with the main controller 32 of FIG. 1 (step 48) and transmits information to the main controller regarding the existence of the second SAT. Also during step 48, the DSP 20 may receive a new command from the main controller 32. During regular operation of the baseband unit 10 of FIG. 1, the main controller 32 may command the DSP 20 to change the frequency (color) of the first SAT and mute the forward or reverse voice signals or even mute the first SAT itself. In addition, special test commands may be input to the DSP 20 during this time.

Following step 48, step 50 is executed and the DSP 20 acquires the reverse voice signal previously received at the receiver 16 of FIG. 1. Thereafter, step 52 is executed, and the DSP 20 generates a subsequent digital sample of the first SAT for output to the CODEC 28 of FIG. 1 in the same manner as step 40. Following step 52, the DSP 20 then processes the previously-received reverse voice signal (step 54) in the manner described in greater detail in FIG. 7. The processing of the reverse voice signal, as occurs during step 54, cannot be done instantaneously once input of the reverse voice signal is initiated because a finite period of time is required to input the bits of the reverse voice signal. Rather than have the DSP 20 remain idle, SAT generation is undertaken during the interval between the input and subsequent processing of the reverse voice signal. Thereafter, step 56 is executed, and the now-processed reverse voice signal is then readied for placement on the line 24 of FIG. 1.

Following step 56, step 58 is executed and the process of SAT detection is continued by inputting a subsequent digital sample of the second SAT from the CODEC 28. Thereafter, step 60 is executed and detection of the second SAT is performed just as during step 46. After step 60, program execution branches back to step 38 and the process is repeated.

Referring to FIG. 4, there is shown a flowchart diagram of the steps executed by the DSP 20 to generate the successive digital samples of the first SAT during steps 40 and 52 of FIG. 3. Within the DSP 20, these digital SAT samples are generated using complex mixing and interpolation functions. The first step (step 60) in the process of SAT generation is to perform a complex mixing (multiplication) operating during which the complex function $1+j0$ is multiplied by the term $\cos(2\pi f_1 n/400)+j\sin(2\pi f_1 n/400)$, where $f_1$ is set by the main controller 32 of FIG. 1 to be $-30$, 0, or 30 when the first SAT is to be 5970, 6000 or and 6030 Hz, respectively, and n is a separate one of the set of 400 Hz cycle numbers. In this way 400 separate sin and cos samples per second are obtained. Recognizing that the functions $\sin(2\pi f_1 n/400)$ and $\cos(2\pi f_1 n/400)$ repeat every forty cycles, each of the 400 separate values can be obtained from a separate one of the forty sin and cos values loaded into the DSP 20 when it was initialized during step 36. In this way, memory space within the DSP 20 can be efficiently employed.

Following step 60, step 62 is executed and a 1:5 interpolation is performed, to expand the 400 values per second obtained during step 60 into 2,000 values per second. The interpolation is carried out by inserting zeros between adjacent complex numbers generated during step 60 and then smoothing the resultant set of values by low-pass filtering techniques. A 1:8 interpolation is then performed during step 64 in exactly the same manner as that just described to obtain 16,000 values per second.

Thereafter, another complex mixing is performed (step 66) during which each of the sin and cos terms produced during step 64 is multiplied by each of the terms $\cos(2\pi 6000n/16,000)+j\sin(2\pi 6000n/16,000)$ where n is a separate one of a set of 16,000 Hz cycle numbers. Because of the repetitive nature of the latter two sin and cos functions, each of the separate 16,000 terms can be obtained from a separate one of no more that eight sinusoidal values stored in a look-up table within the DSP 20, the table being derived from a separate one of the forty stored sin and cos terms. A successive one of these values is output to the CODEC 28 of FIG. 1 during steps 40 and 52 of FIG. 3. Note that the each of the terms $\cos(2\pi 6000n/16,000)+j\sin$ ($2\pi 6000n/16{,}000$) completely specifies the phase and amplitude of the first SAT.

Referring FIG. 5, there is shown the steps executed by the DSP 20 of FIG. 1 to process the forward voice signals. In the case where the forward voice signals are initially received from line 24 of FIG. 1, the signals will be eight-bit, $\mu$-law-encoded. To enhance the accuracy of the forward voice signal processing, it is desirable to convert each initially-received, $\mu$-law-encoded, forward voice signal into a linear-encoded signal consisting of an eight-bit mantissa and a five-bit exponent. Thus, at the outset of processing the forward voice signal, a $\mu$-law-to-linear conversion is performed during step 68. In locations where A-law encoding is employed, the conversion performed during step 68 will be an A-law to linear conversion.

Following step 68, the gain of the forward voice signal is adjusted during step 70. Adjustment of the gain of the forward voice signal is accomplished by multiplying its value by a scale factor established by the main controller 32 of FIG. 1. After step 70, a 2:1 syllabic compression is performed on the forward voice signal (step 72). Such compression is accomplished by performing a fixed point division, using the value of (comp$_c$) as the divisor, where comp$_c$ is a low-pass filtered feedback signal which is given by:

$$\text{comp}_c = 0.99375 \, \text{comp}_{c1} + 0.00625 \, |\text{delay (comp}_o)|$$

where comp$_{c1}$ is the value of comp$_c$ employed during the previous execution of step 72 (the initial value of comp$_{c1}$ being unity) and the term delay (comp$_o$) represents the value of the last forward voice signal that had been compressed (the resultant value after the previous execution of step 72).

Following step 72, the now-compressed forward voice signal is next pre-emphasized (i.e., a portion of the previous forward voice signal supplied to the CODEC 26 of FIG. 1 is subtracted therefrom) during step 74 in accordance with the relationship:

$$V_{out} = 1.319368(V_{in} - 0.98 \, \text{prem}_s)$$

where $V_{out}$ is the resultant pre-emphasized signal, $V_{in}$ is the input signal, and prem$_s$ is the previously pre-emphasized forward voice signal (initially zero) produced during the previous execution of step 74.

After step 74, the forward voice signal, which has now been gain-adjusted, compressed, and pre-emphasized, is then limited during step 76. Such limiting is accomplished by simply truncating a portion of the resultant forward voice signal produced after step 74. The last step in processing the forward voice signal is to high pass filter the signal (step 78) using standard digital signal-processing techniques.

FIG. 6 illustrates, in flowchart form, the steps executed by the DSP 20 of FIG. 1 to detect the presence of the second SAT which, as should be recalled, is the SAT produced by the mobile unit 12. The first step (step 80) in detecting the second SAT is to perform a complex mixing (multiplication) on the incoming sample of the second SAT by multiplying the value of the term $s+j0$ (where s is the magnitude of the digitized value of the second SAT) by each of the terms cos ($2\pi 6000n/16{,}000$)+j sin ($2\pi 6000n/16{,}000$) where n is a separate one of 16,000 cycle numbers. The values for the sin and cos functions can be obtained from the those generated during the process of SAT generation described with respect to FIG. 4.

Next, step 82 is executed and an 8:1 decimation is performed on the complex values generated during step 80. Typically, the decimation is performed by simply deleting every other value and then performing a low-pass filtering operation until 2000 separate values (samples) per second remain. Following step 82, step 84 is executed and a 5:1 decimation is performed in the same manner as during step 82 to reduce the 2000 samples to 400 samples per second.

Step 86 is then executed following step 84 and another complex mixing operation is then performed. The mixing is accomplished by multiplying the samples obtained during step 84 by each of the complex terms cos ($2\pi f_1 n/400$)+j sin ($2\pi f_1 n/400$) where $f_1$ is set by the main controller 32 of FIG. 1 to $-30$, 0, or $+30$, depending on whether the frequency of the incoming second SAT is expected to be 5970, 6000 or 6030 Hz and n is a separate one of 400 cycle numbers. The values of the sin and cos functions are obtained from the forty stored values in the memory of the DSP 20.

After step 86, step 88 is executed and a 5:1 decimation is performed, yielding some 80 samples which are then smoothed by low-pass filtering in a manner similar to the decimation performed during step 84. Following step 88, the resultant SAT samples are low-pass filtered during step 90. Lastly, step 92 is executed and the power of the second SAT is obtained by summing the squares of the low-pass filtered samples. The SAT power obtained is smoothed, yielding a quantity referred to as "smoothed SAT power" (SSP).

Also during step 92, a check is made whether the level of the SAT power is above a predetermined threshold, thus signaling that the mobile unit 12 of FIG. 1 remains in communication with the receiver 16 and transmitter 14 of FIG. 1. Knowing whether the mobile unit 12 remains in communication with the receiver 16 has failed, as indicated by a drop in SAT power, then the line 24 should be returned to an off-hook state. Unfortunately, checking whether the SAT power is at or above a predetermined level is complicated by the fact that the power of the second SAT tend to vary, even when the mobile unit 12 is in communication with the transmitter 14 and the receiver 16.

To check the level of the power of the second SAT, a unique de-bounce scheme is used which is illustrated in flowchart form in FIG. 8. At the outset, a check is made as to whether the SSP is at or above a first level $S_1$ by applying a low-pass filtering operation on SAT power (step 94a). If so, then a bit, signifying the SSP power level, is set to a particular state, typically zero (step 94b). After a fixed interval (step 94c), during which time the DSP 20 has decided that, indeed, the SSP is above the level $S_1$, then a check is made as to whether the smoothed SAT power is below a level $S_2$ (step 94d) where $S_1 > S_2$. If so, then the SSP power level bit is set to the opposite state (a "1") (step 94e). After another fixed interval (step 94f), during which time the DSP 20 of FIG. 1 has decided that indeed the SAT power is too low, then a check is made whether the smoothed SAT power is greater than $S_1$ (step 94a). This process is continuously repeated. By making successive power measurements using different threshold values, the ultimate determination of whether the SAT power is above the appropriate threshold is rendered less sensitive to variations in the SAT power level.

Figure 7:
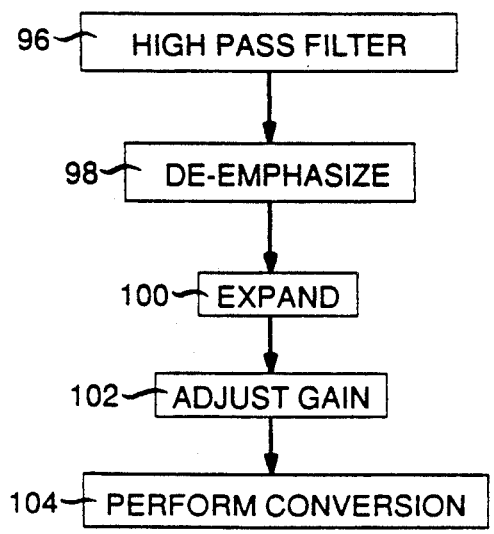
FIG. 7 is a flowchart diagram depicting the steps executed by the baseband unit of FIG. 1 to process a reverse voice signal.

Referring to FIG. 7, there is shown a flowchart diagram of the steps executed by the DSP 20 in processing the reverse speech signals. The first step (step 96) in the process of processing the reverse speech signal is to high-pass filter the digitized reverse speech sample received from the CODEC 26 of FIG. 1. The next step is to de-emphasize the digitized voice signal sample (step 98) by adding a portion of the delayed (i.e., the previous) reverse voice signal thereto. In particular, the reverse voice signal is de-emphasized during step 98 in accordance with the relationship:

$$V_{out} = 0.07579385\ V_{in} + 0.98\ deem_s$$

where $V_{out}$ is the output (de-emphasized) reverse voice signal, $V_{in}$ is the input reverse voice signal and $deem_s$ is the previously de-emphasized reverse voice signal (initially zero) produced during the previous execution of step 98.

After step 98, the now de-emphasized voice signal is then subjected to a 2:1 syllabic expansion during step 100. The 2:1 expansion of the reverse voice signal is accomplished by performing a fixed-point multiplication on the signal in accordance with the relationship:

$$exp_{out} = exp_i \cdot exp_c$$

where $exp_i$ is the input reverse voice signal to be expanded, $exp_{out}$ is the output (expanded signal) and $exp_c$ which is low-pass filtered, is given by:

$$exp_c = (0.99375\ exp_{c1} + 0.00625 | delay\ (exp_i) |$$

where $exp_{c1}$ is the value of $exp_c$ during the previous execution of step 100 and $delay(exp_i)$ is the value of the previous reverse voice signal to the DSP 20.

Following step 100, then step 102 is executed and the gain of the now-expanded reverse voice signal is adjusted by a scale factor established by the main controller 32 of FIG. 1. Finally, the reverse voice signal which exists in digital form in the DSP 20 of FIG. 1 as an eight-bit mantissa and a five-bit exponent, is converted to a μ-law-encoded eight-bit signal for transfer to the line 24 of FIG. 1 during step 104.

The foregoing describes a baseband signal-processing unit 10, which advantageously serves to process both forward and reverse voice signals as well as performing the functions of SAT generation and SAT detection. The baseband unit 10 of the present invention advantageously employs a single element, the digital signal processor 20, for carrying out the above-described functions, allowing the baseband unit to be made very compact, thus saving space.

It is to be understood that the above-described embodiments are merely illustrative of the principles of the invention. Various modifications and changes may be made thereto by those skilled in the art which will embody the principles of the invention and fall within the spirit and scope thereof.

I claim:

1. A baseband processing unit comprising:
   processor means for: (a) periodically acquiring and processing a first (forward) voice signal, (b) periodically producing successive digitized samples of a first supervisory audio tone (SAT) during the interval between successive acquisitions of the forward voice signal; (c) periodically acquiring and processing a second (reverse) voice signal, and (d) detecting the presence of a second SAT by sampling successive digitized samples thereof and establishing their power during the interval between successive acquisitions of the forward voice signal; and
   communication means for communicating the forward and reverse voice signals to and from the processor and for carrying the first SAT signal from the processor and for carrying the second SAT to the processor.

2. The apparatus according to claim 1 wherein the processor means comprises:
   a digital signal processor; and
   a timing and logic circuit for supplying the digital signal processor with periodic sync signals.

3. The apparatus according to claim 1 wherein said communications means comprises:
   a first coder/decoder for encoding the forward and reverse voice signal supplied to the processor means and for decoding the processed forward and reverse voice signals produced by the processor means; and
   a second coder/decoder for decoding the first SAT after it has been produced by the processor and for encoding the second SAT before it is passed to the processor.

4. The apparatus according to claim 3 wherein the communications means further includes a bandpass filter for filtering the signals input to, and output from, each of the first and second coder/decoders.

5. For use in a land-based cellular telephone cell site having a transmitter for transmitting both forward voice signals and a first supervisory audio tone (SAT) to a mobile unit, and a receiver for receiving both reverse voice signals and a second SAT from the mobile unit, a baseband unit for processing the forward and reverse voice signals and for generating the first SAT and for detecting the second SAT, comprising:
   digital signal processor means for: (a) periodically acquiring and processing a first (forward) voice signal, (b) periodically producing successive digitized samples of a first SAT during the interval between successive acquistion of forward voice signals, (c) periodically acquiring and processing a second (reverse) voice signal from the receiver, and (d) detecting the presence of a second SAT received by the receiver by sampling successive digitized samples thereof and establishing the power thereof during the interval between successive acquisition of the forward voice signals;
   coder/decoder means for coding and decoding forward and reverse voice signals and SAT's communicated between the processor means and the transmitter and the receiver; and
   a bandpass filter for filtering the signals coded and decoded by the coder/decoder means.

6. The apparatus according to claim 5 wherein the coder/decoder means comprises:
   a first coder/decoder for coding and decoding the forward and reverse voice signals; and
   a second coder/decoder for decoding and coding the SAT's.

7. A method of processing signals comprising the steps of:
   periodically acquiring a first (forward) voice signal and processing it to perform at least one prescribed operation thereon;
   periodically generating successive digitized samples of a first supervisory audio tone (SAT) such that at least two successive samples are generated within the interval between successive acquisitions of the forward voice signal;

detecting a second SAT during each interval between successive acquisitions of the forward voice signal by sampling at least two successive second SAT samples and calculating the power thereof; and periodically acquiring and processing a second (reverse) voice signal such that at least one reverse voice signal is acquired and processed within the interval signal following receipt of a control signal.

8. The method according to claim 7 wherein the first SAT is generated by the steps of:

performing a first complex mixing operation by multiplying the complex number $1+j0$ by each of the complex terms $\cos(2\pi f_1 n/x) + j \sin(2\pi f_1 n/x)$ where $f_1$ is selected in accordance with the desired frequency of the first SAT and n is a separate one of a set of cycle numbers $x = (1, 2, 3 \ldots 400)$, and where x is an integer;

performing a 1:5 interpolation and a low-pass filtering on the terms generated upon completion of the first complex mixing operation to expand the number of terms 5 fold;

performing a 1:8 interpolation and low-pass filtering on the terms generated after the first interpolation to expand the number of terms remaining by 8; and performing a second complex mixing operation on the terms generated after the second interpolation by multiplying each term by each of the complex number terms $\cos(2\pi 6000k/(16,000)) + \sin(2\pi 6000k/(16,000))$ to yield a plurality of first SAT samples where k is a separate one of a set of cycle numbers $1, 2, 3 \ldots (16,000)$.

9. The method according to claim 7 wherein the second SAT is detected and the power level measured by the steps of:

performing a complex mixing operation on each successive sample of the second SAT by multiplying the complex number $s+j0$ (where s is the magnitude of the sample) by each of a set of terms $\cos(2\pi 6000k/(16,000)) + j \sin(2\pi 6000k/(16,000))$ where k is a separate one of the cycle numbers $1, 2, 3 \ldots (16,000)$;

performing an 8:1 decimation and subsequent low-pass filtering on the terms generated after the complex mixing operation to reduce the number of terms obtained after low-pass filtering by a factor of 8;

performing a second complex mixing operation by multiplying each of the terms remaining after the 8:1 decimation by each of the complex terms $\cos(2\pi f_1 n/x) + j \sin(2\pi f_1 n/x)$ where $f_1$ is selected in accordance with the expected frequency of the second SAT, n is a separate one of a set of cycle numbers $x = (1, 2, 3, \ldots 400)$ and x is an integer;

performing an 5:1 decimation and subsequent low-pass filtering of the values obtained after the second complex mixing operation;

performing a low-pass filtering operation on the samples remaining after the 5:1 decimation operation; and calculating the power of the second SAT by summing the squares of the samples after the low-pass filtering operation.

10. The method according to claim 9 further including the step of determining if the SAT power is above a predetermined first level.

11. The method according to claim 10 wherein the determining step is accomplished by the steps of:

(a) checking whether the level of the SAT power is above the first level, and if so, then signaling that such a condition exists;

(b) waiting a predetermined interval;

(c) checking whether the SAT power is below a second predetermined level, and if so, then signaling that the SAT power level is below the first level;

(d) waiting a predetermined interval, (e) repeating the steps of (a), (b), (c), and (d).

12. The method according to claim 8 wherein the forward voice signal is processed by the steps of:

adjusting the gain of the forward voice signal;
compressing the forward voice signal;
pre-emphasizing the forward voice signal;
limiting the forward voice signal; and
high-pass filtering the forward voice signal.

13. The method according to claim 8 wherein the reverse voice signal is processed by the steps of:

high-pass filtering the reverse voice signal;
de-emphasizing the reverse voice signal;
expanding the reverse voice signal; and
adjusting the gain of the forward voice signal.

* * * * *